United States Patent Office 3,088,798
Patented May 7, 1963

3,088,798
EXTRACTION OF A METAL FROM SOLUTIONS CONTAINING SAME
Charles A. Fetscher, Short Hills, N.J., assignor to Nopco Chemical Company, Harrison, N.J., a corporation of New Jersey
No Drawing. Filed May 25, 1959, Ser. No. 815,245
15 Claims. (Cl. 23—14.5)

The present invention relates to a particular class of solid chelating agents and their use in the extraction of heavy metals from solutions. More particularly, this invention pertains to a novel and superior process of extracting a heavy metal from solutions containing same by means of high molecular weight organic polymers referred to hereinafter as polyamidoximes.

The problem of extracting as well as recovering heavy metal ions is of extreme importance. For instance, in the matter of river pollution by industrial wastes, due to public and governmental pressure, industries must remove toxic waste components from plant effluents. Among the important problems are toxic concentrations of heavy metals such as copper. Moreover, due to increased use of fissionable materials, increased quantities of highly dangerous radioactive materials are created which must be completely recovered for special disposal. Some of these dangerous radioactive species are heavy metal cations.

In many instances, besides the problem of removing metals from industrial wastes prior to disposal, these same metals are undesirable during the operations per se. Some metallic contaminants interfere in flotation processes and must be removed or deactivated. Metals such as copper are undesirable in steam generators, condensers and other equipment through which water is passed. Many processes such as textile dyeing, paper making, etc., require careful regulation and protection against a metal contaminant. The deactivation of metallic contamination which would interfere with the process contemplated is the only important commercial use of chelating agents today.

In many industrial processes, loss of metals represents a large economic loss. For instance, non-recovery or insufficient recovery of precious metals from plating baths adds greatly to costs. Similarly, in precious metal refining per se, it is extremely desirable to cut down loss of metal through refinery wastes. In fact, in any refining process, recovery of metals from mill effluents and other aqueous wastes would greatly reduce overall costs of operation. In most flotation processes, dissolved metallic values represent a loss. The heavy metal ores are very limitedly soluble in water and dissolved concentrations in the tailings water will seldom exceed possibly 100 p.p.m. No process of the prior art can economically recover heavy metals from such low concentrations. Although the concentration of the valuable metal in the tailings water will be very low, the volume of water used by even a small flotation mill is enormous and the total metal value lost is important.

In the recovery of uranium, the problem is very important. Uranium is relatively valuable, it is found in relatively low concentrations, and its salts are fairly soluble. A very considerable percent of the uranium is lost in the tailings of an ore beneficiation plant. My process will just about completely prevent this loss.

Many innovations have been introduced and tried in order to increase the recovery of heavy metals particularly from dilute aqueous media and have met with varying degrees of success. For instance, ion exchange resins have been used to remove cations from solution by exchanging them for existing cations of the resin. However, the capacities of these resins are quite limited; i.e. of the order of 5 to 20% of the resin weight and the rate of flow through a resin column is also very slow thereby adding to the time required for removal of the metal.

Accordingly, it is an object of the present invention to remove and recover in a novel manner substantially all of a heavy metal of a selected group present in solution, particularly in aqueous media, which metal has economic value or whose presence is not desired.

It is a further object to remove and recover a heavy metal particularly when it is present in minute quantities, i.e., of the order of 10 to $10^{-4}$ p.p.m. in aqueous media, in an economical and substantially complete manner.

Another object is to remove and recover a heavy metal ion from non-aqueous solutions.

Still further objects are to make use of a collecting agent that is relatively inexpensive, easy to adapt to a variety of processes, and capable of giving up the removed metallic ion for its recovery and capable of being regenerated in most instances in a direct manner.

Other objects will become apparent from the detailed description given herein. It is intended, however, that the detailed description and specific examples do not limit the invention, but merely indicate preferred embodiments thereof since various changes and modifications within the scope of the invention will become apparent to those skilled in the art.

It has been unexpectedly discovered that the above and other objects can be accomplished by bringing a solution containing the heavy metal ion to be removed into contact with a chelating agent comprising a high molecular weight organic polymer containing amidoxime substituents referred to hereinafter as a polyamidoxime. Substantially complete removal of the metallic ion from the liquid medium is accomplished by such procedure. During contact between the solution and the chelating agent, the amidoxime groups and the metallic ions react to form a complex thereby withdrawing the ions from solution. The ions can be removed from the complex and recovered if desired. Also, in most instances, the chelating agent is simultaneously regenerated during the removal of the ions. In my process, the solid chelating agents, as will be demonstrated hereinafter, do not merely deactivate the metal, they remove it, thus both the metal and the chelating agent are recovered and the chelating agent can be reused again and again. The soluble chelating agents of commerce, e.g., ethylene diamine tetra acetic acid and its analogues would be extremely difficult to recover and are seldom, if ever, reused.

Amidoximes as chemical entities, have long been known. Ley and Krafft, Berichte 40, 697 (1907), mention the colored inner salts formed by relatively simple amidoximes and a few cations; however, they have been studied very little. Probably because of the similarity of their structure to the very unstable amidines (amidoximes are also called hydroxyamidines), the belief that they are quite unstable persists (see Sidgwick, Organic Chemistry of Nitrogen, 1937, p. 201). Contrary to such prior beliefs, polyamidoximes are quite stable, i.e., they are not hydrolyzed or decomposed by cold dilute acid or alkali (from pH below 1 to about 13) in any reasonable time.

Polyamidoximes are very effective solid chelating agents. I use the expression "solid chelating agents" to mean chelating agents which function without being dissolved. The fact that these polyamidoximes or any such solid chelating agent is able to form extremely stable complexes with a heavy metal is distinctly surprising. Solid chelating agents have been little studied or considered by those skilled in the art in this field of chemistry because they appear to have a considerable handicap. They cannot saturate the coordination sphere of a heavy metal because of their limited mobility although it may happen to a limited degree under some special conditions. The reason is that most heavy metals show coordination numbers of six, a few have values of four and a few have eight. Considering coordination numbers of six as typical and realizing that the values of four and eight represent only differences in degree, three bidentate chelating entities are required to fill the coordination sphere of the heavy metal ion. The amidoxime entity per se in bidentate although of course the polymer molecule as a whole is multidentate. However, the chelating groups on the polymer are randomly separated, and it is most improbable that the relatively rigid molecules of the solid can curl and encompass the metallic ion in order to saturate all of its coordination sphere. Thus, solid bidentate chelating agents can in general occupy only two sites in the coordination sphere of the metal ion. It is true that unsaturated complexes are known, however, they are generally assumed to be considerably less stable than complexes in which one or several molecules of the chelating agent completely saturate the coordination number of the metal ion and which saturation tends to form whenever possible. Hence, it is surprising that these solid polyamidoximes which incompletely saturate the coordination sphere of the metal form such stable complexes with them. The stability of these complexes is demonstrated by their formation at very low pH, the inability to disrupt a complex with a noble metal, i.e., gold, platinum, or palladium by treatment with concentrated mineral acids, and the formation of the complex from amazingly low concentrations of the metal ion.

I have discovered that the polyvalent metals which may be removed and recovered from solutions containing same are a number of those ions of heavy metals of atomic weight above about 50 selected from the periodic chart of the elements. The solid polyamidoximes are particularly effective with polyvalent heavy metals, which form colored ions in solution. Furthermore, I have discovered that solid polyamidoximes complex with and extract the polyvalent metals from very dilute solutions, e.g., as low as concentrations of $10^{-5}$ to $10^{-10}$.

Table I sets forth the metals along with their approximate minimum pH values for their extraction which I have found may be extracted and recovered from solutions containing same. I do not specify a maximum pH limit since extraction may be accomplished under alkaline conditions so long as the ion remains in solution. In the case of gold, this would allow for extraction up to a pH of about 7 since at higher pH's the gold will normally precipitate out of solution. Also, in most instances the metal which has been extracted by the solid polyamidoxime may be eluted or feed therefrom. Of course, if a polyamidoxime which is chelated with one of these metals is eluted, then these same pH values are controlling, i.e., they represent, with the exception of the noble metals, an approximate maximum value at which the particular metal may be separated from its complex. However, in practice it is preferable to elute at a pH appreciably below the minimum pH value for chelation. Table I discloses the metals for extraction and elution (except of course, the noble metals). However, it is understood that these metals when in their polyvalent states may exist in several ionic forms, of which the following are exemplary.

Simple cation _____ $Cu^{+2}$.
Complex cation _____ $UO_2^{+2}$.
Complex anion _____ $AuCl_4^{-1}$; $PdCl_4^{-2}$; $PtCl_6^{-4}$; $RuCl^{-2}$; $[UO_2(NO_3)_3]^{-1}$; $[UO_2(CH_3COO)_3]^{-1}$.
Hydrated or ammoniated ion _____ $Cu(NH_3)_4^{+2}$.

TABLE I

| Metal: | pH (minimum value for extraction; maximum value for elution) |
|---|---|
| Plutonium | <1 |
| Gold | <1 |
| Platinum | <1 |
| Palladium | <1 |
| Rhodium | About 1 |
| Thallium | About 1.5 |
| Vanadium | About 1.5 |
| Uranium | About 2 |
| Ruthenium | About 2 |
| Copper | About 3.5 |
| Nickel | About 4 |
| Cobalt | About 4 |
| Chromium | About 4 |

By the pH "<1" is meant acidic pH's which are below a pH of 1 and which are usually not accurately measurable on pH indicators which generally are accurate down to a pH of about 1.

It is probable that only the metallic element is incorporated in the amidoxime complex and that the dissociation equilibrium of the complex ion supplies enough of the simple cation to exceed the concentration in equilibrium with the amidoxime. Thus, I believe, the equilibrium

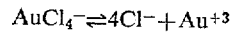
$$AuCl_4^- \rightleftharpoons 4Cl^- + Au^{+3}$$

is far to the left normally but the tiny concentration of cationic gold is more than can exist in equilibrium with the amidoxime. It is therefore consumed and the dissociation of the chlorauric ion goes to completion. Whatever the mechanism, I can extract these metals equally well from solutions in which they are part of complex anions or from solutions in which they are simple cations. In fact, I have found that solid polyamidoximes recover uranium about as well from a solution rich in sulfate ion in which the uranium is present as an anionic complex

$$[UO_2(SO_4)_2]^{-2}$$

as from a simple solution of uranyl acetate in distilled water, wherein uranium is present as the uranyl ion, $UO_2^{++}$. Polyamidoximes also extract uranium from strong sodium carbonate solution wherein the uranium is complexed with carbonate. Such solution is frequently used to remove uranium from ion exchange resins.

Thus, I have discovered that the solid polyamidoximes offer an outstanding means to accomplish extraction of particular polyvalent metals. They are far more useful and economical in operation than either water soluble or oil soluble chelating agents. Water soluble chelating agents are obviously useless for the recovery or removal of metals from aqueous solution since no economical separation from the water is possible. Oil soluble chelating agents do function, but the separation of two liquid layers, especially in the presence of the soap like polar-nonpolar complex which is formed is far more complicated and troublesome than filtering out a granular resin or lifting out of solution a fibrous polyamidoxime. There is also a very considerable difference in potential capacity. A chelating group is of course polar and to make the molecule oil soluble, the chelating group is attached to, and diluted by, a large oil solubilizing radical. This means that oil soluble chelators necessarily have low capacity based upon weight. The resinous or fibrous chelators described herein do not need this dilution and therefore can have very high capacity compared to these oil soluble chelators.

Moreover, most of the heavy metal ions considered herein have a coordination number of six and therefore will combine with three bidentate chelate groups when possible as in the case of a water or oil soluble chelating agent which is highly mobile. Hence, this factor contributes to a low capacity due to the fait accompli of complete saturation with these soluble chelators. On the other hand, the solid polyamidoxime chelators can, and essentially do form, only a one to one complex with the heavy metal ion as described previously herein. Hence, even considering an equal number of identical bidentate chelating groups, the solid polyamidoximes have three times the capacity of an oil or water soluble chelator of the same functional group for an ion having a coordination number of six. Furthermore, by their very nature, i.e., their viscosity, their emulsifying tendencies, and their cost, oil soluble chelators are used in dilute oil solutions containing 1% to 5% by weight of active material. The solid chelator of my process is used as is, i.e., 100% active.

Thus, in view of the history of amidoxime complexes and in view of the fact that I am able to achieve only partial saturation of the coordination spheres of certain ions with the solid polyamidoximes, my discovery of the extraction and elution under specified conditions of pH was most unexpected. In view of the foregoing considerations, one would ordinarily expect no extraction, i.e., no chelation due to the incomplete saturation of the coordination spheres of the metals. Indeed, the list of metals in Table I which may be extracted elicits no basis for predicting the success of the present invention. I am aware of prior work set forth in Belgian Patent No. 541,496 in which a polyamidoxime was treated with a warm dilute ferric chloride solution thereby removing the ferric ions from the solution (Example 18). In this example, the procedure is silent as to what other, if any, ions could be extracted. Thus, even from a study of this procedure, my discovery of the extraction of particular metal ions was not at all obvious.

GENERAL CONSIDERATIONS OF EXTRACTION AND RECOVERY

As stated before, I have discovered that the various polyvalent metals listed in Table I, when in solution will form complexes with solid polyamidoximes which vary in their stability to acids. It was this discovery which makes it possible to extract the particular ion from a solution containing same.

For instance, the solid polyamidoxime can extract a noble metal (gold, platinum or palladium) from a solution containing same under strongly acid conditions, i.e., at a pH below 1. Although platinum and palladium cannot be eluted from their chelate with the solid polyamidoxime, they still may be advantageously recovered from a solution containing same by the formation of the chelate complex. In view of their high monetary worth, the destruction of the polyamidoxime to recover these metals is justified. Gold may be released by treatment with sodium or potassium cyanide or thiourea in strong acid solution.

In the case of uranium, the solid polyamidoximes chelate it very well at a pH above about two. A polyamidoxime thus chelated with uranium may be freed therefrom or regenerated by treatment with an acid.

For the purpose of regulating pH during extraction and elution, I may use any organic or inorganic acid with or without a buffer in order to achieve the desired pH. The acids may be added per se, or as an aqueous solution thereof. Convenient acids are hydrochloric, sulfuric, formic oxalic, etc. It is, of course, understood that other acids may be used and their selection is obvious to one skilled in the art.

The adjustment of the pH of the solution in order to carry out the extraction of the ion under consideration is, of course, within the skill of the art. In fact, in many instances due to the inherent pH of the solution it may not be necessary to manually adjust the pH of the solution before bringing it into contact with a solid polyamidoxime if the pH is at or above the value set forth for the metal in Table I.

I have found that temperatures employed during extraction and elution of the metal ion are not critical. Since the solid polyamidoxime, whether in the form of fibers, fabrics, granules, etc., is stable up to about 125° C., I may use temperatures up to such value. Of course, lower temperatures, even down to the freezing point of the solutions may be used. In other words, the temperature of the materials which is usually room temperature has been found to be convenient. Of course, in industrial processes, the temperature of the liquid bodies to be treated may be above or below room temperature; but, as stated above, the temperatures are not critical.

In addition to aqueous media, including water as well as such commodities as beer, wines, milk, etc., my process may be carried out in non-aqueous media, e.g., methanol, ethanol or any solvent which will dissolve traces of metal salts.

PREPARATION OF THE CHELATING AGENTS

The polyamidoximes of the present invention may be prepared in a direct and economical manner. Their preparation is based upon the reaction of a nitrile containing polymer with hydroxylamine at temperatures of between 0° and 100° C. for from about ¼ to 40 hours, in a solvent for hydroxylamine. Solvents such as water and alcohols e.g., methanol, ethanol, or propanol, are satisfactory. Hydroxylamine, as is well known in the art, is commercially available only in the form of its salts such as hydroxylamine sulfate and hydroxylamine hydrochloride. Hence, it is necessary to neutralize a solution of the salt to a pH of about 7.5 in order to utilize the free base. It is only the free base which reacts with the nitrile substituents.

There are a great many types of nitrile containing resins or polymers which can be used in the present invention to serve as starting materials for the preparation of the polyamidoximes. For example, the largest and most economically feasible group comprise the homopolymers and copolymers of acrylonitrile. In the copolymers, the comonomer may be one or more of the common copolymerizable monomers such as styrene, butadiene, vinyl chloride, etc. including all the monomers which will copolymerize with acrylonitrile. A representative list appears on page 50 of the book, "The Chemistry of Acrylonitrile," by the American Cyanamid Company (1951). The nitrile content essential for the formation of the amidoximes of this process can arise from other sources beside acrylonitrile. Polymers containing alpha-methacrylonitrile, alpha-ethacrylonitrile, fumaryl dinitrile or vinylidene cyanide or the like are perfectly satisfactory. It is only necessary that the homopolymer or copolymer be water insoluble. It is prefered that the polymer contain at least about 10% by weight of nitrile for optimum effectiveness. Note that 10% by weight of nitrile (CN) is about 20% by weight of nitrile calculated as acrylonitrile. This means that in the case of copolymers of acrylonitrile, the non-nitrile comonomers, one or several, can total as much as 80% by weight of the final resin weight. Since the homopolymer is completely satisfactory, the comonomer content obviously can be zero. Thus, the composition of the resinous nitrile substrate can be from about 20% to 100% by weight of acrylonitrile or an equivalent weight of another nitrile containing monomer, e.g., alpha-methacrylonitrile, and 80% to 0% of one or more comonomers. By "copolymer" I mean polymers obtained from the polymerization of acrylonitrile or other nitrile containing monomers with at least one other monomer copolymerizable therewith. Depending upon the process of polymerization, the copolymer may be characterized as random, alternating, graft or block copolymer. The term polymer as used herein includes both homopolymers and copolymers.

In general, the molecular weight of the polymers from which the polyamidoxime is prepared is in no way critical. They merely have to be high enough in molecular weight to be substantially insoluble in water and there is no upper limit. The commercially available acrylonitrile homopolymers and copolymers are all completely satisfactory. For the fibrous products the molecular weight should lie between about 40,000 and 150,000. To carry out my process, I prefer to use preformed fibers in the form of commercially available synthetic textile materials containing these fibers in their woven or non-woven form.

An additional type of nitrile containing polymer is the natural or synthetic polymer to which acrylonitrile has been added as a side chain on the polymer. Cyanoethylated cellulose as cyanoethylated cotton, cyanoethylated viscose rayon or cyanoethylated insolubilized polyvinyl alcohol are all perfectly satisfactory for the preparation of the polyamidoximes provided that the cyanoethylation is carried out to the extent of at least about 20% by weight of the polymer calculated as acrylonitrile (10% by weight of nitrile calculated as "CN"). As is obvious to one skilled in the art, the substrate for the cyanoethylation need not be pure cellulose or pure polyvinyl alcohol. The cellulose can be partially esterified or the like, the polyvinyl alcohol may contain some polyvinyl acetate or other extraneous unit in its structure. In fact, the polyvinyl alcohol must be insolubilized before cyanoethylation to be useful in this process. This is easily accomplished by treatment with formaldehyde or glyoxal or by vigorous heat treatment. It is only necessary that the resin retain enough active hydroxyl sites to permit cyanoethylation to the degree cited. With these materials I prefer, also, to use preformed fibers; that is, the commercially available natural or synthetic textile materials in either woven or non-woven form.

As my examples demonstrate, only a partial conversion of the nitrile groups of nitrile containing polymers to amidoxime groups will occur. It must be appreciated that not all of the nitrile substituents can be converted to amidoxime substituents. The nitrile substituents present in the inner portions of the resin are not exposed to the hydroxylamine reactant. The extent of this conversion as indicated by the quantity of hydroxylamine consumed appears to range from about 20% to about 75%. Closed systems were used to preclude the loss of hydroxylamine and thus the hydroxylamine consumed is a fair measure of the extent of reaction. This means that a 100% polyacrylonitrile resin is converted to a polyamidoxime containing from about 19.8% to 57% by weight of amidoxime substituent,

calculated as such, based upon the total weight of the resin. However, in experiments with cyanoethylated cotton showing a nitrogen content of only 5% (10% by weight of CN, or 20% by weight as acrylonitrile), in some instances the conversion was as low as 40% and the cotton amidoxime was a perfectly operable fibrous chelator with adequate capacity for metals. This corresponds to an amidoxime content of about 8.5% by weight of the polymer. This appears to be quite low but it is fairly certain from steric and spatial considerations which have been previously alluded to that there is little possibility for the chelating agent to completely satisfy the coordination number of the metal. Instead of associating with three amidoxime entities the metal can only approch one, or at most and only to a slight extent, two. This actually is a more economical utilization of the chelating function and makes these low concentration amidoximes perfectly operable and useful. The following table shows how the metal capacity increases with amidoxime content assuming a one to one interaction. It is obvious that even polyamidoximes of very low amidoxime content chelate appreciable quantities of heavy metals. There is of course, no lower limit. As long as the resin contains some amidoxime, it has some chelating capacity.

CALCULATED METAL CAPACITY OF A POLYAMIDOXIME AS A FUNCTION OF THE AMIDOXIME CONTENT ASSUMING A ONE TO ONE COMPLEX

| Percent by weight of amidoxime | Mol. weight of polymer per amidoxime substituent | Capacity, as percent of resin weight | |
|---|---|---|---|
| | | Gold | Uranium |
| 1 | 5,900 | 3.4 | 4.0 |
| 2 | 2,950 | 6.7 | 8.0 |
| 5 | 1,180 | 16.7 | 20.2 |
| 10 | 590 | 33.5 | 40.4 |
| 15 | 393 | 50.0 | 60.7 |
| 20 | 295 | 67.0 | 80.0 |
| 25 | 236 | 83.5 | 100.0 |
| 30 | 196 | 100.0 | 121.0 |
| 35 | 169 | 117.0 | 141.0 |
| 40 | 147 | 134.0 | 162.0 |
| 45 | 131 | 150.0 | 182.0 |
| 50 | 118 | 167.0 | 202.0 |

I, then, have prepared resinous polyamidoximes containing from 8.5 to 57% by weight of amidoxime substituents. However, in the case of cyanoethylated cellulose, the practical upper limit is about 6% nitrogen introduced. Hence, if this nitrogen which is about 12% nitrile groups is completely converted to amidoxime, a maximum of about 25% by weight of amidoxime substituents can be introduced into the cellulose polymer. The preceding figures are obviously not absolute limits of operability since samples somewhat lower or some higher in amidoxime content can be prepared and used. Hence, material containing as little as 5.0% or even considerably less, or as much as 60% by weight of amidoxime substituents, depending upon the nature of the polymer would be operable and within the scope of my invention. However, to assure a material which is not appreciably acid sensitive during its use and regeneration, an amidoxime content of about 5.0% to about 25% by weight is preferred. Of course, if a cross-linked polymer is used, then material containing up to about 60% by weight of amidoxime substituents may be used in contact with acids without fear of acid sensitivity.

There are many examples of the resinous materials described above available in fibrous form to serve as a substrate for the preferred embodiment of this invention. Several so-called acrylic fibers are available in commercial or semi-commercial scale. These are all, save one, based upon acrylonitrile. The exception is based upon vinylidene cyanide and is a perfectly satisfactory alternative. Also, there is the much publicized cyanoethylated cotton. I have prepared cyanoethylated viscose rayon and also cyanoethylated polyvinyl alcohol fiber from the Japanese insolubilized polyvinyl alcohol fiber, trade-named "Kuralon." The fibers listed below are all satisfactory for conversion to fibrous polyamidoximes.

| Fiber | Treatment, if any | Composition |
|---|---|---|
| Orlon | None | >90% acrylonitrile. |
| Acrilan | do | Do. |
| Creslan | do | 95-96% acrylonitrile. |
| Zefran | do | >90% acrylonitrile. |
| Verel | do | About 50% acrylonitrile. |
| Dynel | do | 40% acrylonitrile, 60% vinyl chloride. |
| Darlan | do | 50 mole percent vinylidene cyanide, 50 mole percent vinyl acetate. |
| Cotton | Cyanoethylated | 21.7% acrylonitrile. |
| Viscose | do | 26.2% acrylonitrile. |
| Kuralon | do | 20.4% acrylonitrile. |

The detailed compositions of a few additional and typical acrylonitrile polymers which are satisfactory for the production of my polyamidoximes are listed below. The figures are the percents by weight of each monomer in the polymer.

90% acrylonitrile–10% vinylacetonitrile
50% acrylonitrile–50% methacrylonitrile
97% acrylonitrile– 3% vinyl acetate
50% acrylonitrile–50% vinyl acetate 95% acrylonitrile– 5% methyl methacrylate
65% acrylonitrile—35% methyl acrylate
45% acrylonitrile–10% methyl acrylate–45% vinyl acetate
44% acrylonitrile–44% vinyl chloride–12% methyl acrylate
93% acrylonitrile– 7% 2-vinyl pyridine
26% acrylonitrile–74% butadiene
40% acrylonitrile–60% butadiene (A)
33% acrylonitrile–67% styrene (B)
100% acrylonitrile (C)

A detailed description of the procedures using the last three polymers is given below. The products were evaluated qualitatively by their ability to chelate gold, uranium and copper. The process for preparing the polyamidoxime is very straightforward and it is not necessary to vary it greatly from sample to sample. Other useful polyamidoximes are described in Belgian Patent No. 541,496.

In Examples I through XIV a closed system was used, i.e., the reflux condenser was capped to prevent loss of the volatile hydroxylamine.

Example I

*Amidoxime of polyacrylonitrile (C in table above).—* 40 grams of powdered polyacrylonitrile were added to 750 cc. of a methanolic solution of hydroxylamine. The solution contained 0.048 g. $NH_2OH$ per cubic centimeter. The mixture was allowed to reflux for 10 hours then cooled and the solvent removed by filtration. On a basis of the amount of hydroxylamine which was reacted, about 40% of the acrylonitrile substituents were converted to amidoxime. This is equal to 35.7% amidoxime based on the final resin weight. This powder, shaken with a dilute solution of copper sulfate immediately discharged the blue color and itself turned a deep green. The residual copper in the solution was determined by analysis to be 0.2 p.p.m. of solution. The powder also strongly chelated uranium and gold. Analysis (gain in weight and ash content) showed that it combined with more than 60% of its weight of uranium.

The amidoxime is a strongly basic group and this sample of uncross-linked polyacrylonitrile in its finely powdered form was easily and relatively completely converted to a polyamidoxime which was soluble in strong mineral acid. Upon reprecipitation with alkali it seemed to be unchanged in chelating power. This demonstrated that these polyamidoximes are relatively stable chemical entities and can go through this solution and regeneration without chemical breakdown.

Solubility of the polymer in acid would frequently be undesirable but it is easily avoided by moderating the conditions of reaction, e.g., by using a lower temperature, a shorter reaction time, a lower concentration of hydroxylamine, by using a granulated resin rather than a powder (alcohol and water do not swell polyacrylonitrile appreciably and hence hydroxylamine will not penetrate and react with as much polymer as in the case of the powder) or by using a copolymer containing some non-nitrile and therefore non-convertible monomer. A cross-linked copolymer would obviously be satisfactory. The acrylic fibers, even when almost 100% homopolymers of acrylonitrile are so highly oriented and impervious to solvents that conversion to the extent of acid solubility is easily avoided.

Example II

*Acrylonitrile styrene copolymer (resin B of preceding table).—* A commercially available acrylonitrile-styrene copolymer containing 33% acrylonitrile and 67% styrene by weight was converted to the polyamidoxime as follows: The resin was obtained as cubes about one quarter inch in each dimension. These cubes were crushed in a mortar to about ten mesh size. 25 g. of this granulated resin were added to 500 cc. of an aqueous solution of hydroxylamine and held at 90° C. for 24 hours while being gently agitated. The solution contained 0.06 gram of hydroxylamine per cc. and was prepared by neutralizing an aqueous solution of hydroxylamine sulfate with an equivalent amount of sodium hydroxide. The sodium sulfate formed remained in the solution. After the 24 hour treatment the granules were removed from the solution, washed with cold water and dried. The hydroxylamine consumed indicated a conversion of about 20% of the nitrile groups and a final amidoxime content of 7.1% by weight of the resin. It successfully extracted the color from dilute solutions of copper sulfate, uranium acetate and gold chloride.

I have used methanolic solutions of hydroxylamine for most of my work because methanol is a good solvent for hydroxylamine and its salts and because the boiling point of methanol which is 65° C. is a convenient automatic temperature control. I have also used ethanol and isopropanol with equivalent results. Other alcohols may be used but the solubility of hydroxylamine salts rapidly diminishes as the alcohol increases in molecular weight. The reaction seems to be very slightly slower in water but the final product is as good as that formed using alcohol.

Example III

*Acrylonitrile butadiene copolymer (resin A of preceding table).—* A commercially available acrylonitrile-butadiene copolymer containing 40% acrylonitrile and 60% butadiene in crumb form was converted to the amidoxime as follows: 25 g. of the soft granular material were heated in 500 cc. of an aqueous solution of hydroxylamine containing 0.04 g. of hydroxylamine per cc. The mixture was held at 55° C. for 24 hours. At the end of this time the resin was removed from the liquid, washed with water and dried. The hydroxylamine consumed indicated a conversion of 25% of the nitrile groups and a final amidoxime content of 10.9% by weight. The resin successfully extracted the color from dilute aqueous solution of copper sulfate, uranium acetate and gold chloride.

The amidoximes of the nitrile containing resins in fibrous form were prepared in a very similar manner except that care had to be exercised to prevent damage to the fibers. Very gentle conditions were necessary with some of the thermoplastic synthetic fibers.

Example IV

*The amidoxime of cyanoethylated cotton.—* 142 g. of cyanoethylated cotton flannel (5.7% N) were immersed in 1480 cc. of a methanolic solution of hydroxylamine. The solvent was refluxed for 23 hours. The cloth was then removed, washed with water and dried. The cotton was not damaged and essentially unchanged in hand. The hydroxylamine consumed indicated an amidoxime content of 9.3% of the final weight of the modified cotton. Samples of it removed most of the gold uranium and copper from dilute solutions of these metals by a simple filtration step. The solutions were merely slowly filtered through the treated cloth.

Example V

*The amidoxime of an acrylic fiber (Zefran).—* 8.6 grams of Zefran fabric (a light weight twill) were immersed in 376 cc. of a 0.045 g. $NH_2OH$/cc. solution in methanol. The mixture was refluxed for ten hours. The cloth was then removed, washed with water and dried. The hydroxylamine consumed indicated an amidoxime content of 9.7% by weight. As with the cotton derivative, this cloth strongly chelated a number of heavy metals.

The following examples, set forth in tabular form, were carried out in the same manner as indicated in the preceding examples. As previously indicated, all preparations were carried out in a closed system.

| Ex. | Original fiber | Mole ratio,[a] $NH_2OH$/fabric | Gms. fabric | Gms. $NH_2OH$ | $NH_2OH$[b] conc., g./cc. | Time, hours | Temp., °C. | Hand | Gms. $NH_2OH$ reacted | Amidoxime, percent by weight of the fiber |
|---|---|---|---|---|---|---|---|---|---|---|
| VI | Acrilan | 4.35:1 | 5.3 | 14.3 | .032 | 1 | 65 | Very sl. stiff | .19 | 8.0 |
| VII | Cotton (print) cyanoethylated | 2.8:1 | 64.0 | 23.9 | .035 | 18 | 65 | do | 3.35 | 8.5 |
| VIII | Creslan | 2.16:1 | 1.6 | 2.2 | .023 | .5 | 65 | Sl. stiffening | .11 | 12.3 |
| IX | Darlan | 2.0:1 | 2.5 | 4.5 | .055 | 2 | 25 | do | .19 | 13.7 |
| X | Dynel | 2.0:1 | 8.0 | 10.0 | .023 | 1.5 | 50 | No change | .38 | 8.6 |
| XI | Orlon | 2.4:1 | 3.6 | 5.4 | .023 | 4 | 65 | Sl. yellow | .20 | 10.0 |
| XII | Verel | 2.0:1 | 6.3 | 7.88 | .023 | 1.5 | 50 | Sl. stiffening | .39 | 11.0 |
| XIII | Zefran | 4.0:1 | 6.8 | 16.9 | .045 | 4 | 50 | Very sl. stiff | .34 | 8.9 |
| XIV | Dynel paper | 4.3:1 | 6.0 | 16.1 | .042 | 5 | 62 | No change | .29 | 8.5 |

[a] A molecular weight of 246 was used for the cyanoethylated cotton cloth (based on N content of 5.7%). The acrylic fibers were assumed to be polymers of acrylonitrile and a molecular weight of 53 was used.
[b] This involves an excess of $NH_2OH$ over the polymer and particularly where part of the polymer is derived from a non-convertible comonomer.

Although I have concentrated my studies on fabrics I have also studied fibers. I found that the fibers behave exactly as the fabrics made from those fibers. The conversion of the nitrile group to the amidoxime obviously can be effected in a manner similar to the preceding examples on fibers and yarns, as well as on the nonwoven fabrics made from these fibers and yarns.

The polyamidoximes prepared in granular form are extremely effective in removing heavy metal ions from solution. In most cases, they remove the given ion so thoroughly that the determination of the quantity remaining in solution represents a very difficult analytical chore. In many instances, there was no detectible amount of gold, uranium or platinum in solutions of these metals after contact with my polyamidoximes.

*Example XV*

*Extraction of copper.*—The effectiveness of the polyamidoxime of Example I which was prepared from powdered polyacrylonitrile was evaluated quantitatively for the extraction of copper as follows.

A. Copper capacity of the resin: A copper sulfate solution containing 500 p.p.m. of copper was prepared. The solution showed a pH of 5.1. Two 200 cc. portions were taken therefrom and treated with the resin by adding 200 mg. of the resin to the first solution and 400 mg. of the resin to the second. The suspensions were shaken, allowed to settle and the powder which had turned green was removed from each solution by filtration. The solutions were analyzed to determine the residual copper. The copper content of the original solution was also carefully determined.

The results were as follows:

| | Residual Cu conc., p.p.m. | Residual Cu, grams | Chelated Cu, grams | Chelated Cu as percent of resin (resin capacity) |
|---|---|---|---|---|
| Control solution (a 200 cc portion) | 509 | .1018 | | |
| 1st sol. (200 mg. resin added) | 287 | .0574 | .0444 | 22.2 |
| 2nd sol. (400 mg. resin added) | 218 | .0436 | .0582 | 14.6 |

B. Resin efficiency: The completeness with which the metal is removed by an excess of polyamidoxine.

Quantities amounting to 200, 300 and 400 mg. of the polyamidoxime of Example I were added to 200 cc. portions of a copper sulfate solution containing 10 p.p.m. of copper and shaken. The powder was removed and the solutions were analyzed for copper. The results:

```
                             Residual Cu conc.
                              found, p.p.m.
Control _____ 9.7
Treated solutions:
  200 mg. resin _____ 0.09
  300 mg. resin _____ 0.031
  400 mg. resin _____ 0.025
```

The resin therefore has a capacity for copper equal to at least 15 to 20% of its weight as shown in part A and its efficiency was very good as demonstrated by the fact that it quickly and easily lowered the copper concentration below 0.1 p.p.m. as shown in part B.

The pH of the solution referred to in this example (part A) as well as in subsequent examples is the pH of the initial solution prior to contact with the solid polyamidoxime.

As the above example shows, these polyamidoximes in granular or powder form are effective and useful for the extraction of heavy metals. However, as previously set forth, the polyamidoximes in fibrous form are a particularly preferred embodiment. Fibers, i.e., normal textile fibers, are equivalent to very fine powders in two of their three dimensions and the surface area per unit volume offered by such fibers is almost equal to that of powders of the same diameter. A high surface area per unit volume is, of course, a very desirable feature of any solid intended for the treatment of liquids. A simple calculation shows how fibers and spherical resin granules compare. Neglecting the ends, which shortcut penalizes the fibers very slightly, the ratio of surface area to volume is 4 over $d$ for fibers and 6 over $d$ for spheres. In other words, a fiber is equivalent to a sphere of 50% greater diameter and the following relationship exists between fibers and equivalent spherical resin granules.

| Fiber diameter, mm. | Sphere | |
|---|---|---|
| | Diameter, mm. | Mesh-size |
| .02 | .03 | −325 |
| .04 | .06 | −230 |
| .09 | .12 | −120 |
| .20 | .30 | −150 |

A 50 mesh resin (0.30 mm. diameter) is the finest which is practicable and .02 mm. is the average mean diameter of a cotton fiber. This means that fibers ten times as coarse as cotton (.20 mm.) are equivalent to the surface area of commercial resins. Thus cotton is ten times better as to surface-volume ratio than the commercial ion exchange resins. Therefore, by passing a liquid through one or more layers of a textile fabric amidoxime, I achieve surface contact equivalent to what would be realized by the very, very slow percolation of the liquid through a bed of extremely fine resin.

Hence, the fibrous polyamidoximes offer a greatly improved speed or throughput over any other form. Fibrous amidoximes, because of the speed with which liquid can pass through them with effective contact and because of the efficiency with which the amidoxime groups extract metals, make it possible to recover mineral values from very large volumes of extremely dilute solutions. The fabric polyamidoximes have the further advantage that they are self-supporting structures. They may take the form of a filter cloth in any geometrical form, e.g., rectangular or circular; they may be mounted upon a frame or be formed into a sleeve or sack of any size or shape.

HEAVY METAL EXTRACTION

Example XVI

*Extraction of gold.*—Three small samples of the amidoxime of cyanoethylated cotton (a 6 oz. cotton flannel cyanoethylated to a nitrogen content of 5.7% and treated with hydroxylamine to yield an amidoxime content of 11.5% by weight) were immersed in 15 cc. solutions of gold chloride containing 1,12 mg. of gold per cc. The solutions showed a pH of 2.87. The cloth samples weighed about 200 mg. In a short time the color was discharged from the solutions and the originally white fabrics had become tan. More gold solution was added from time to time until the yellow color of the solution became permanent. The fabrics were then considered to be saturated. The quantity of gold remaining in the solution was determined by evaporation to dryness, ashing and weighing the gold residue. The fabric samples were then ashed. The ash figures, although a little high, confirm the gold take-up reasonably well.

The findings were as follows:

|  | #1 | #2 | #3 |
| --- | --- | --- | --- |
| Au in original solution, mg | 17.25 | 17.25 | 17.25 |
| Au in added solution, mg | 50.01 | 62.04 | 56.40 |
| Total Au (calculated), mg | 67.26 | 79.29 | 73.65 |
| Au in final solution (found), mg | 6.2 | 18.3 | 6.2 |
| Au absorbed, mg | 61.06 | 60.99 | 67.45 |
| Original sample weight of amidoxime containing textile, mg | 199.5 | 189.0 | 173.0 |
| Au absorbed, calculated as percent of original weight of amidoxime containing textile | 30.6 | 32.3 | 38.8 |
| Ash weight of fabric samples, mg | 66.2 | 64.5 | 71.0 |

Thus, these fibrous amidoximes demonstrated a capacity for gold equivalent to 30% to 40% of their original weight.

I have found that solid polyamidoximes will extract gold from solutions of from strongly acid pH (<1) up to a pH of about 7. At higher pH's the gold will normally precipitate out of solution.

Example XVII

A small sample of the amidoxime of Zefran acrylic fiber, from Example V (about 200 mg.), was immersed overnight in 100 cc. of a solution of gold chloride containing 100 p.p.m. of gold. The solution showed a pH of 2.8. After the fabric was removed, the solution showed no test for gold by the purple of Cassius test. This test employs stannous chloride which gives a purple coloration to a strongly acid solution of gold. If less than about 3 p.p.m. gold is present, the coloration is yellow. My solution did not discolor at all. This means less than about 1 p.p.m. gold remained in the solution.

Example XVIII

*Extraction of copper.*—Swatches of several of the amidoximes were immersed in solutions of copper sulfate containing 10 p.p.m. copper at room temperature overnight. The solutions showed a pH of 5.2. The samples, slightly greenish in color after their immersion, were removed and the solutions analyzed for residual copper. The method used was the color obtained by the addition of the sodium salt of diethyl dithiocarbamate. This color was determined at 436 mu and compared with standards by means of a photoelectric colorimeter. This method was used to determine the copper concentration in the other examples as well. The results with the several fibrous amidoximes were as follows:

| Fabric | Cu remaining, p.p.m. | Percent Cu extracted from 10 p.p.m. |
| --- | --- | --- |
| Acrilan | 0.5 | 95 |
| Creslan | 1.2 | 88 |
| Darlan | 0.7 | 93 |
| Orlon | 0.6 | 94 |
| Verel | 0.7 | 93 |
| Zefran | 0.3 | 97 |
| Cyanoethylated cotton | 0.8 | 92 |

These differences are probably within experimental error and the fibrous amidoximes can be considered approximately equivalent for the extraction of copper.

Example XIX

A sample of an actual mill waste from a large plant was secured. It showed 9.6 p.p.m. of copper and 400 mg. per liter of ammonium sulfate and had a pH of 4.5. However, the pH varied upwardly to about 7 on occasions during plant operations. Therefore, the solution was divided into two parts and one half was adjusted to a pH of 7.4 by the addition of a very small quantity of ammonium hydroxide.

The first solution, the actual mill effluent having a pH of 4.5, was extracted with a sample of the polyamidoxime from Orlon acrylic fiber (10.0% by weight amidoxime). It showed 9.6 p.p.m. of copper at the start and 0.3 p.p.m. after overnight contact with the Orlon amidoxime. This corresponds to a recovery of 97%.

The second solution, the original adjusted to a pH of 7.4, was extracted by overnight contact with the amidoxime of Zefran acrylic fiber (9.7% by weight amidoxime). The adjustment in pH had not changed the copper content detectibly. The solution showed 9.6 p.p.m. at start and 0.4 p.p.m. after extraction. Recovery was 96%.

Example XX

*Extraction of uranium.*—My fibrous amidoximes show a very strong tendency to extract uranium and in attempting to appraise the ultimate sensitivity I was forced to use solutions so dilute as to be outside the limits of sensitivity of the methods of analysis available. The fibrous amidoxime complex of uranium is yellow going to orange when much uranium is present. Therefore, I used the formation of this colored complex as an indicator of the extraction of uranium. Under the conditions used as set forth in the following paragraph, this conclusion is justified and inescapable.

Five gallons of carefully demineralized water were slowly filtered through a snow white sample of the amidoxime of cyanoethylated cotton fabric (6 oz. cotton flannel, 9.3% by weight of amidoxime). Cotton was used because the synthetics, although better in several respects, were all more or less yellowish. The water did not discolor the fabric. This demonstrated that the fabric did not contain any heavy metals in a form capable of discoloring the fabric down to the sensitivity of the cloth. In other words, I was now sure that there was nothing in this five gallons of water which would discolor the fibrous amidoxime and interfere with the color formed when uranium is complexed with the polyamidoxime. Then 1 cc. of a solution containing 0.095 mg. of uranium per cc. in the form of uranyl acetate was added to this five gallon quantity of known to be pure water. The resulting solution had a pH of just about 7. It was then filtered slowly through a fresh sample of the same absolutely clean, white, cotton flannel amidoxime. The rate of filtration was such that five gallons required about fifteen hours. The filter cloth was carefully protected from dust during this operation. At the end of the filtration, the fibrous amidoxime was distinctly and strongly yellowed over those areas which the water had touched. It was concluded that the polyamidoxime had certainly extracted some of the uranium from this 5 parts per billion solution.

A second portion of ten gallons of carefully demineralized water was further purified by filtering through the amidoxime of cyanoethylated cotton flannel exactly as described above. Then to this 10 gallons of specially purified water, 2 cc. of a $2.84 \times 10^{-5}$ gram per cc. solution of uranium was added. This made the overall concentration of uranium 1.5 parts per billion parts of water. The ten gallons of solution were then slowly filtered through a clean sample of the white amidoxime of the cyanoethylated cotton flannel. The entire procedure was exactly as described above for the 5 parts per billion solution. The filtration required about 24 hours and a definite yellow stain developed on the fabric. The fabric was carefully ashed in a platinum crucible and the ash analyzed for uranium by the method described by Yoe, Will and Black in Analytical Chemistry, volume 25 page 1200 (1953). The uranium found was .0000375 g. This is a recovery of 67% of the .0000568 g. originally present. Ocean water is stated to contain 1.5 parts per billion of uranium. (See "The Oceans" 1942, page 176, Sverdrup, Johnson and Fleming.)

REGENERATION OF POLYAMIDOXIMES AND EFFECT OF pH

For the most part, the complexed metals can be eluted from the polyamidoximes and the chelating agent thereby regenerated and made ready for reuse. Gold, platinum and palladium form such strong complexes that the metal is not removed even with concentrated mineral acids. Gold can be released by treatment with sodium or potassium cyanide or thiourea in strong acid solution. As regards platinum and palladium, their high monetary worth justifies the destruction of the polyamidoxime to recover them. However, all the other metals which form a complex with the polyamidoxime can be removed from the complex by the action of mineral acid. A 1 to 10% solution of hydrochloric or sulfuric acid normally will instantly disrupt the colored complex and thus regenerate the active chelate. The following example demonstrates the facility of this operation.

Example XXI

A small sample of the amidoxime of the Zefran acrylic fabric of Example XIII was immersed in a solution of copper sulfate which had a pH of 4.5. Within a half hour it was deep green. It was transferred to a 2% solution of HCl. The color disappeared almost instantly. The fabric was returned to the copper solution where it quickly became green again. A second dip in the acid discharged the color again. This alternate treatment was repeated a dozen times. There seemed to be no loss of chelating efficiency. The same procedure was found to be operable with uranium, nickel, cobalt and ruthenium.

Although most metals can be extracted from the complex by strong acid, these complexes do form down to quite low pH's. My amidoximes complex with cobalt down to a pH of about 4; nickel to a pH of about 4; ruthenium to a pH of about 2; uranium to a pH of about 2; copper to a pH of about 3.5. Gold, platinum and palladium, as mentioned above complex even in strong acid. As is illustrated by the quantitative studies with copper which are given in the next example, the above figures are not sharp lines of demarcation and some recovery is possible below the given pH's.

Example XXII

A 100 p.p.m. solution was prepared for copper sulfate. Several portions of this solution were prepared and adjusted to the desired pH's by use of HCl or NH$_4$OH as necessary. A sample of the amidoxime of Verel acrylic fiber (11% by weight amidoxime) was immersed in each solution overnight. The copper was then eluted from each sample with dilute (10%) HCl. The copper remaining in the original solutions and the eluted copper in the acid solution were determined. The distribution was as follows:

| pH | Percent residual copper | Percent recovered copper |
|---|---|---|
| 1 | 100 | No Trace |
| 2 | 90 | 10.4 |
| 4 | 27.8 | 73.2 |
| 4.5 | Trace | 96.3 |
| 7.5 | Trace | 97.5 |
| 10.0 | Trace | 99.4 |

Example XXIII

A 4 gram sample of cyanoethylated cotton was immersed for 2 minutes in a 5% by weight solution of m-toluene diisocyanate (80% by weight 2,4-isomer and 20% by weight 2,6-isomer) in benzene. The resulting cross-linked fabric was then centrifuged, vacuum desiccated and heated at 110° C. for one hour. The fabric was thereafter washed with benzene, dried, soaked in water for four hours and finally dried. The total weight gain was found to be 0.221 gram.

The above cross-linked fabric was treated for 6 hours at 75° C. in an aqueous hydroxylamine solution containing 0.045 gram hydroxylamine per cc. of water. Thereafter the fabric which was a cross-linked polyamidoxime was water washed and dried.

A sample of the above fabric completely discharged the color from an aqueous solution of gold chloride containing one mg. of gold per cc. of water. The pH of the solution was 2.8. The fabric itself turned brown in color due to the complex formed with the gold.

Another sample of the same isocyanate treated fabric was found to chelate copper from an aqueous copper sulfate solution containing 0.5% by weight of copper and having a pH of 5. The fabric turned green due to the complex formed with the copper. The green color of the fabric was removed, i.e., the copper was eluted by brief contact with a 1% by weight aqueous solution of hydrochloric acid. Contact of the fabric with the acid did not appear to damage the fabric in any way. By comparison, a polyamidoxime prepared from cyanoethylated cotton, but not treated with m-toluene diisocyanate in order to introduce cross linking rapidly disintegrated and partially dissolved when contacted with the 1% hydrochloric acid solution.

Example XXIV 0.1 gram of a fibrous polyamidoxime was immersed in a 25 cc. solution containing 0.0132 gram per liter of plutonium nitrate (13.2 p.p.m.) and 18.9 grams per liter of nitric acid. The pH of the solution was 0.7. The fibrous polyamidoxime chelated 50% of the plutonium in an hour and 80% after standing overnight. The residual solution contained 2.6 p.p.m. of plutonium which was not chelated. Plutonium as indicated above, appears to behave like the more common noble metals and is not eluted from the polyamidoxime by strong acid.

The fibrous polyamidoxime of Example XXIV was prepared according to the directions of Example V, but on a much larger scale. Twenty-five yards of a Zefran shirting fabric were treated for four hours at 60° C. in a commercial dye beck containing 6650 grams of hydroxylamine hydrochloride in 55 gallons of water. 5800 grams of potassium hydroxide were also present to free the hydroxylamine from its hydrochloride salt. The cloth was then removed, washed with water and dried. The fabric showed 2.4% by weight of oxime nitrogen content, i.e., almost exactly equivalent to the 9.7% by weight amidoxime content of the material of Example V.

The polyamidoxime whether in the form of granules, fibers, yarns, woven or non-woven fabrics, etc., has many uses. A principal use is in the recovery of a metal ion as disclosed in Table I from solutions containing same. The resulting chelated polyamidoxime in most instances may be eluted with acid to recover the metal. Moreover, in view of the exceedingly high capacities which may be achieved, the chelated polyamidoxime may be used as such. For instance, if the polyamidoxime is chelated with a radioactive metal isotope, e.g., $U_{235}$, it will serve as an efficient neutron source which may be used as a fuel element in a reactor. For example, complexes of active uranium isotopes and fibrous polyamidoximes carrying from about 5% to about 40% by weight of uranium, based on the total weight of the complex, are extremely useful especially because of the efficient utilization of the neutrons. The disintegrating atoms are essentially on the surface of the material. There is no external layer of extraneous material to slow or absorb the neutrons. Thus, the neutrons are essentially 100% available for triggering chemical reactions or transmutation changes. In the form of a fabric, the uranium complexed polyamidoxime is much superior to an extremely thin sheet of uranium or uranium oxide. Such a metal or oxide sheet of one of the active isotopes would be difficult and dangerous to fabricate and would be very feeble. The fabric is quite strong and all the operations needed to prepare the fabric take place before the dangerous radioactive isotope is added. The fabric is also easily deformable to yield desired structures and shapes. Furthermore, a mass of fibers carrying one of the radioactive isotopes is readily permeable to gases and liquids which are to be altered by the energy of the radioactive charge. Thus, when used as fuel elements an activated source of energy is supplied for purposes of sterilization, reaction between chemicals, etc.

If polyamidoxime, especially in the form of woven material or non-woven bat is chelated with a nobel metal for instance about 25% to 35% by weight of gold based on the total weight of the complex, it will serve as a relatively light-weight and flexible radiation shield. Also, the solid polyamidoxime, if chelated with a particular metal ion may thus serve as a catalyst carrier for reactions which are promoted by traces of a particular metal, for instance, copper or nickel in amounts of, e.g., about 1% to 5% by weight of the metal based on the total weight of the complex.

It must be appreciated that many modifications within the scope of the present invention will occur to those skilled in the art. For instance, my process is admirably adapted for continuous use from the standpoint of extraction, elution and regeneration of the polyamidoxime. For instance, a mechanically driven endless belt comprising a solid polyamidoxime may be continuously passed through a plurality of tanks which may contain, in series, the solution to be treated, a washing tank, an acid tank for elution and regeneration, a further washing tank, etc. Each tank may be connected to both filling and emptying means which means may be regulated in their operation in a timed relationship with the travel of the endless belt.

This application is a continuation-in-part of my co-pending application, Serial No. 673,157, filed July 22, 1957, now abandoned.

Having described my invention, what I claim as new and desire to secure by Letters Patent is:

1. A process for extracting a polyvalent metal from a solution containing same as the sole metal present which comprises the steps of bringing a solid, solvent insoluble polyamidoxime into contact with said solution consisting essentially of a polyvalent metal as the sole metal present in said solution selected from the group consisting of:

| | pH |
|---|---|
| Plutonium | <1 |
| Gold | <1 |
| Platinum | <1 |
| Palladium | <1 |
| Rhodium | About 1.0 |
| Thallium | About 1.5 |
| Vanadium | About 1.5 |
| Uranium | About 2.0 |
| Ruthenium | About 2.0 |
| Copper | About 3.5 |
| Nickel | About 4.0 |
| Cobalt | About 4.0 |
| Chromium | About 4.0 | at a pH not numerically lower than the numerical value set forth above and not greater than the pH at which said metal precipitates out of solution whereby said polyvalent metal reacts with the amidoxime radicals of said polyamidoxime to form a chelate structure therewith and thereafter separating the resulting chelated solid polyamidoxime from said solution.

2. The process of claim 1 in which said polyamidoxime is a polymer containing from about 5.0% to 60% by weight thereof of amidoxime radicals.

3. The process of claim 1 in which said polyamidoxime is a high molecular weight organic nitrile containing polymer, said polymer having at least some of its nitrile radicals converted to amidoxime radicals.

4. The process of claim 1 in which said polyamidoxime is a high molecular weight organic polymer containing at least about 10% by weight of nitrile radicals, said polymer having some of said nitrile radicals converted to amidoxime radicals, there being present in the polymer from about 5.0% to 60% by weight of said amidoxime radicals.

5. The process of claim 1 in which said polyamidoxime is a high molecular weight organic nitrile containing polymer selected from the group consisting of a polymer of acrylonitrile, a polymer of vinylidene cyanide, cyanoethylated cellulose and derivatives thereof and cyanoethylated polyvinyl alcohol, said polymer having at least some of said nitrile radicals converted to amidoxime radicals.

6. A process for extracting uranium from a solution consisting essentially of uranium as the sole metal present comprising the steps of bringing said solution containing uranium as the sole metal present into contact with a solid, solvent insoluble polyamidoxime at a pH numerically above about 2 and not greater than the pH at which uranium precipitates out of solution, whereby said uranium reacts with the amidoxime radicals of said polyamidoxime to form a chelate structure therewith and thereafter separating the resulting chelated solid polyamidoxime from said solution.

7. A process for extracting copper from a solution consisting essentially of copper as the sole metal present comprising the steps of bringing said solution containing copper as the sole metal present into contact with a solid, solvent insoluble polyamidoxime at a pH numerically above about 3.5 and not greater than the pH at which copper precipitates out of solution, whereby said copper reacts with the amidoxime radicals of said polyamidoxime to form a chelate structure therewith and thereafter separating the resulting chelated solid polyamidoxime from said solution.

8. A process for extracting plutonium from a solution consisting essentially of plutonium as the sole metal present comprising the steps of bringing said solution containing plutonium as the sole metal present into contact with a solid, solvent insoluble polyamidoxime at a pH numerically above <1 and not greater than the pH at which plutonium precipitates out of solution, whereby said plutonium reacts with the amidoxime radicals of said polyamidoxime to form a chelate structure therewith and thereafter separating the resulting chelated solid polyamidoxime from said solution.

9. A process for extracting gold from a solution consisting essentially of gold as the sole metal present comprising the steps of bringing said solution containing gold as the sole metal present present into contact with a solid, solvent insoluble polyamidoxime at a pH numerically above <1 and not greater than the pH at which gold precipitates out of solution, whereby said gold reacts with the amidoxime radicals of said polyamidoxime to form a chelate structure therewith and thereafter separating the resulting chelated solid polyamidoxime from said solution.

10. A process for eluting a polyvalent metal from a solid, solvent insoluble polyamidoxime chelated with said metal which comprises the steps of bringing a solid, solvent insoluble polyamidoxime chelated with a single polyvalent metal selected from the group consisting of:

|  | pH |
|---|---|
| Rhodium | About 1.0 |
| Thallium | About 1.5 |
| Vanadium | About 1.5 |
| Uranium | About 2.0 |
| Ruthenium | About 2.0 |
| Copper | About 3.5 |
| Nickel | About 4.0 |
| Cobalt | About 4.0 |
| Chromium | About 4.0 | into contact with a solution having a pH not numerically greater than the numerical value set forth above, whereby said metal is freed from its complex with said solid, solvent insoluble polyamidoxime and thereafter separating the solid polyamidoxime free from said metal from the solution enriched with said metal.

11. A solid, solvent insoluble polymer containing from about 5.0% to about 60% by weight thereof of amidoxime radicals complexed with a single polyvalent metal selected from the group consisting of

| | |
|---|---|
| Plutonium | Uranium |
| Gold | Ruthenium |
| Platinum | Copper |
| Palladium | Nickel |
| Rhodium | Cobalt |
| Thallium | Chromium |
| Vanadium | |

12. A solid, solvent insoluble polymer containing from about 5.0% to about 60% by weight thereof of amidoxime radicals complexed with a single polyvalent metal which is plutonium.

13. A solid, solvent insoluble polymer containing from about 5.0% to about 60% by weight thereof of amidoxime radicals complexed with a single polyvalent metal which is copper.

14. A solid, solvent insoluble polymer containing from about 5.0% to about 60% by weight thereof of amidoxime radicals complexed with a single polyvalent metal which is uranium.

15. A solid, solvent insoluble polymer containing from about 5.0% to about 60% by weight thereof of amidoxime radicals complexed with a single polyvalent metal which is gold.

References Cited in the file of this patent
UNITED STATES PATENTS

| | | |
|---|---|---|
| 2,812,233 | Lewis et al. | Nov. 5, 1957 |
| 2,902,514 | Benneville et al. | Sept. 1, 1959 |
| 2,909,542 | Soloway | Oct. 20, 1959 |
| 2,933,475 | Hoover et al. | Apr. 19, 1960 |

OTHER REFERENCES

Chem. Abs., vol. 45, 5572(i) (1951).

Martell et al.: "Chemistry of the Metal Chelate Compounds," 446–49, 468–69 (1952), Prentice-Hall, Inc., New York.

Martell et al.: Ibid, paper No. 2, pp. 433–445, 450–467.

UNITED STATES PATENT OFFICE
CERTIFICATE OF CORRECTION

Patent No. 3,088,708

May 7, 1963

Charles A. Fetscher

It is hereby certified that error appears in the above numbered patent requiring correction and that the said Letters Patent should read as corrected below.

Column 3, line 53, for "feed" read -- freed --; column 12, in the table at the bottom of the column, third column, line 4 thereof, for "-100" read -- -50 --; column 13, line 15, for "1,12" read -- 1.12 --; column 19, line 9, strike out "present", second occurrence.

Signed and sealed this 8th day of September 1964.

(SEAL)
Attest:

ERNEST W. SWIDER
Attesting Officer

EDWARD J. BRENNER
Commissioner of Patents